Patented June 2, 1925.

1,540,456

UNITED STATES PATENT OFFICE.

JAMES ELIOT BOOGE, OF WILMINGTON, DELAWARE, ASSIGNOR TO E. I. DU PONT DE NEMOURS & COMPANY, OF WILMINGTON, DELAWARE, A CORPORATION OF DELAWARE.

LITHOPONE AND PROCESS OF MAKING SAME.

No Drawing.　　Application filed September 27, 1923.　Serial No. 665,228.

*To all whom it may concern:*

Be it known that I, JAMES ELIOT BOOGE, a citizen of the United States, and a resident of Wilmington, in the county of New Castle and State of Delaware, have invented a certain new and useful Lithopone and Process of Making Same, of which the following is a specification.

This invention relates to the production of lithopone, and comprises treating lithopone, and particularly light-resistant lithopone, with a substance having an acid-reaction, this treatment being followed by a washing with water, and, preferably, also by a washing with an alkaline substance to neutralize any retained acid.

The main object of my invention is to improve upon the paint grinding properties of light-resistant lithopone. Other objects will be apparent from the following description:

Lithopone is a white pigment consisting usually of approximately equi-molecular quantities of barium sulfate and zinc sulfide. It is customarily made by the mutual precipitation of these two compounds from solutions of barium sulfide and zinc sulfate prepared by methods well known in the art. The precipitate, which is known as raw or crude lithopone, is filtered, dried, calcined at red heat, quenched in water, ground to a high degree of fineness, washed with water, blued, filtered, dried, disintegrated and packed. Lithopone has a variety of uses as a pigment; for example, in the manufacture of paints, oil cloth, linoleum, window shade cloth, and in the rubber industry.

I have observed that lithopone as heretofore manufactured exhibits marked variations in the ease with which it can be incorporated with an oil or varnish vehicle; also that the consistencies of the paint or paint base obtained when equal weights of different batches of lithopone, even when made by apparently identical procedures, are ground with the same weight of vehicle, vary widely. This observation applies particularly to lithopones which, for the purpose of increasing their resistance to sunlight, are precipitated and calcined in the substantial absence or in the presence of only a small amount of chlorine—say for example from 0.001 to 0.1 gram chlorine per 100 grams lithopone.

As a result of an extensive study of this subject both in the laboratory and on the plant scale, I have discovered that treatment of such light-resistant lithopone, substantially free from chlorine, after it has been calcined and quenched, with an acid or acid reagent, results in a very marked improvement in the ease with which the pigment can be incorporated with an oil or varnish vehicle;—also that the consistencies of the paints and paint bases made from such an acid-treated lithopone show a uniformity which was not heretofore obtainable.

In a copending application under the name of H. S. Schanche, Serial No. 661,098, treatment of lithopone with an acid or an acid reagent for the purpose of increasing the light resistance of the pigment is described. The present invention differs from the above in that acid treatment is applied to a lithopone which is already highly resistant to sunlight by virtue of calcination in the substantial absence of chlorine.

The treatment with acid is preferably made after the lithopone has been ground, although the invention is not limited to treatment at this stage of manufauture inasmuch as treatment before grinding or during quenching or at other stages in the process of manufacture results in similar improvement in the ease with which the pigment is incorporated and ground with an oil or varnish vehicle.

The folowing example will serve as an illustration of the method of carrying out this invention: The lithopone having been calcined, quenched and ground to a suitable fineness, is usually available in the form of a water slurry composed of about one part lithopone to from two to fifty parts water. To this slurry contained in a suitable vat or tub, sulphuric acid is added until the slurry shows an acid reaction to methyl red indicator. During the addition of the acid, the slurry is agitated vigorously. The acid is preferably used in the form of a water solution containing about 30% $H_2SO_4$, although higher or lower concentrations than this may, of course, be used and the inventor does not wish to limit himself to use of acid of any particular range of concentration. The amount of acid required is usually about 1 lb. of 100% $H_2SO_4$ per 100 lbs. of lithopone, although the quantity will vary with different batches of lithopone according to the amount of basic materials contained therein.

The treatment with acid is followed by thorough washing of the lithopone with water to remove substantially all free acid. To remove final traces of acid which are washed out with difficulty, the slurry is finally neutralized with sodium-hydroxide (NaOH) sodium carbonate ($Na_2CO_3$) or other suitable alkaline material. The lithopone is then blued, pressed, dried, and disintegrated as usual.

It will be understood that the treatment with acid may also be carried out in equipment which operates continuously, the acid being run continuously into a stream of the lithopone slurry and the acid treatment followed by continuous countercurrent washing with water.

The use of a large excess of acid over that required to yield an acid reaction to methyl red is to be avoided inasmuch as no further benefit is derived therefrom and such a procedure is wasteful and a greater amount of washing is required to remove the excess acid from the lithopone. It will be understood, however, that moderate excesses of acid do no harm and that other indicators than methyl red may be used; for example, methyl orange or bromophenol blue.

It will be understood that other acids than sulphuric may be used; also that acid salts such as sodium acid sulfate, or salts which when dissolved in water show an acid reaction (as, for example, aluminum sulfate), will likewise be effective in producing the desired improvement in paint grinding properties. It will likewise be understood that smaller amounts of acid than specified above may be used and that some advantage will result therefrom although not to the full extent obtainable by the preferred method of treatment as described. It should be understood, however, that the invention includes treatment with any amount of acid, either more or less than required to produce an acid reaction with methyl red indicator, although the amount of acid required to just produce an acid reaction with methyl red has been found by experience to be preferred.

In the practice of the present invention of treating lithopone with an acid or acid reagent for the purpose of improving its paint grinding properties, a certain quantity of water-soluble salts (mostly zinc sulfate) will be formed as a result of the treatment with acid. This is due to the solution of a portion of the zinc oxide contained in the untreated material. The water soluble salts are removed as far as possible from the product by thorough washing, so that the finished material will usually contain about 0.1% water soluble material and only very rarely more than 0.2%. This removal is believed to be intimately connected with the improvement in paint grinding properties which I have observed.

By proper regulation of the amount of alkaline material (such as sodium carbonate) used in the neutralization of the last traces of acid, lithopone may be produced by the process described which yields a water extract (e. g. 10 grams of lithopone heated with 100 c. c. of water) that is either slightly acid, neutral, or slightly alkaline as desired, the pH value of the extract being between 5.5 and 8.0. Lithopones heretofore manufactured have, as far as I am aware, been such as to yield aqueous extracts that are either alkaline to phenolphthalein or acid to methyl red.

Experience has shown, however, that lithopones which yield substantially neutral or only slightly acid aqueous extract mix and grind more readily with oil and varnish vehicles than lithopones which are alkaline or strongly acid in reaction. In the practice of the present invention, therefore, the amount of alkaline material added as described above is controlled in such a manner that the finished product shows a substantially neutral or only slightly acid reaction, the pH value of the extract being preferably from 6.0 to 7.5.

The method of determining the reaction of the aqueous extract may be briefly described as follows: 10 grams of the lithopone to be tested are heated with 100 cc. of neutral distilled water to the boiling point and allowed to boil exactly five minutes. Evaporation is compensated for by dilution of the slurry with distilled water to its original volume. The lithopone is then allowed to settle. 10 cc. of the clear supernatant solution are drawn off in a pipet and transferred to a test tube and two to three drops of a 1% solution of phenolphthalein in alcohol are added to the solution in the test tube. If the extract is not alaline to phenolphthalein, as indicated by the development of a pink coloration, a few drops of bromothymol blue indicator are added. This indicator shows a blue color in alkaline solutions, bluish green in neutral, and greenish yellow in acid solutions.

An approximate valuation of the hydrogen ion concentration of the aqueous extract can be made by the use of appropriate indicators and comparison with either standard solutions of known hydrogen ion concentration or with a suitable color chart as described in "The Determination of Hydrogen Ions" by William Mansfield Clark, published by Williams & Wilkins Company, Baltimore, Md., 1922, to which reference is made. As described in this reference, a theoretically neutral solution contains a hydrogen ion concentration of $10^{-7}$ grams per liter. The exponent "7" is referred to as the pH value; thus solutions having a pH value greater than 7 are alkaline, those of pH value less than 7 are acid. Phenolphthalein develops a pink coloration in aqueous solutions having a pH value of about 8.3 or more. Lithopones heretofore manufactured yield an aqueous extract which show either (1) pink coloration when a few drops of 1% solution of phenolphthalein in alcohol are added, (i. e., such aqueous extracts have pH values of about 8.3 or greater) or (2) an acid reaction to methyl red (pH value 5.0 or less). The lithopone preferably produced according to the present invention yields an aqueous extract having a pH value of usually between 6.5 and 7.5; such lithopone is more nearly neutral than lithopone made by hitherto known processes. This neutrality in conjunction with the removal of zinc oxide as explained above, is believed to be intimately connected with the improvements in paint grinding properties which I have observed.

The new lithopone products constituting part of my invention, especially when strongly resistant to sunlight, i. e. containing less than 0.1%, and usually between 0.001 and 0.06%, of chlorine, will ordinarily have a pH value of from about 5.5 to 8, and preferably between 6.5 and 7.5. The proportion of water-soluble material in the finished lithopone will as a rule be less than 0.25%, and usually about 0.1%.

I claim:

1. The process of improving the paint grinding properties of a light-resistant lithopone which comprises treating a slurry of the calcined, quenched, and ground lithopone with a substance whose aqueous solution has an acid reaction, until the slurry shows an acid reaction to methyl red indicator, and washing the resulting lithopone until it is substantially free of acid.

2. A process as set forth in claim 1 in which remaining traces of acid in the lithopone are neutralized by treating the latter with an alkaline material.

3. The process of improving the paint grinding properties of a lithopone which has been calcined while substantially free from chlorine, which comprises treating a slurry of the quenched and finely ground lithopone with a substance whose aqueous solution is acid, until the slurry shows an acid reaction to methyl red indicator, and washing with water the lithopone thus obtained until it is substantially free of acid.

4. A process as set forth in claim 3 in which traces of acid in the lithopone are neutralized by treating the latter with an alkaline material.

5. A process as set forth in claim 1 in which the reagent whose aqueous solution is acid is sulphuric acid.

6. A process as set forth in claim 2 in which the reagent whose aqueous solution is acid is sulphuric acid.

7. A process as set forth in claim 3 in which the reagent whose aqueous solution is acid is sulphuric acid.

8. A process as set forth in claim 4 in which the reagent whose aqueous solution is acid is sulphuric acid.

9. The process of improving the paint grinding properties of a lithopone which has been calcined while containing less than 0.1% of chlorine, which comprises treating the calcined, finely ground lithopone with sulphuric acid to convert part of the zinc oxide into zinc sulfate, and then washing with water to remove the zinc sulfate.

10. The process of improving the paint grinding properties of a lithopone which has been calcined while containing less than 0.1% of chlorine, which comprises treating the calcined, finely ground lithopone with sulphuric acid to convert zinc oxide into zinc sulfate, washing with water to remove water-soluble salts, and then neutralizing the remaining acid until the pH value of a lithopone extract is between 5.5 and 8.0.

11. The process of improving the paint grinding properties of a light-resistant lithopone which comprises treating it with a quantity of an acid which is slightly in excess of that required to convert the zinc oxide in the lithopone into a water-soluble salt, and washing out the water-soluble salt.

12. The process of improving the paint grinding properties of a light-resistant lithopone which comprises treating it with a quantity of an acid which is slightly in excess of that required to convert the zinc oxide in the lithopone into a water-soluble salt, and washing out the water-soluble salt and the excess acid.

13. A process as set forth in claim 1 in which the lithopone is treated at any stage of its manufacture after its calcination, with a substance whose aqueous solution is acid.

14. The process of improving the paint grinding properties of a light-resistant lithopone which comprises treating it, after calcination, first with a solution of acid reaction, then with water to remove water-soluble salts, and then with an alkaline solution to neutralize traces of acid.

15. A process as set forth in claim 14 in which the treatment with an alkaline solution is continued until a water-extract of the lithopone has a pH value of between 6 and 7.5.

16. A lithopone whose aqueous extract, obtained by heating 10 grams of lithopone with 100 c. c. of water, is neither alkaline to bromothymol blue, nor acid to methyl red, indicators.

17. A light-resistant lithopone whose aqueous extract, obtained by heating 10 grams of lithopone with 100 c. c. of water, is neither alkaline to bromothymol blue, nor acid to methyl red, indicators.

18. A lithopone containing less than 0.1% of chlorine and yielding, upon heating 10 grams of lithopone with 100 c. c. of water, an aqueous extract that is neither alkaline to bromothymol blue, nor acid to methyl red, indicators.

19. A lithopone as defined in claim 18 in which the aqueous extract has a pH value between 6.0 and 8.0.

20. A light-resistant lithopone whose aqueous extract, obtainable by heating 10 grams of the lithopone with 100 c. c. of water, has a pH value between 6.0 and 8.0.

21. A lithopone as defined in claim 20 in which the aqueous extract has a pH value between 5.5 and 8.0.

22. A lithopone as defined in claim 20 in which the aqueous extract has a pH value between 5.5 and 7.5.

23. A lithopone as defined in claim 20 in which the aqueous extract has a pH value between 6.0 and 7.5.

24. A light-resistant lithopone containing less than 0.06% of chlorine, and yielding, upon heating 10 grams of said lithopone with 100 c. c. of water, an aqueous extract that has a pH value between 5.5 and 8.0.

25. A lithopone as defined in claim 24 in which the pH value is between 6 and 7.5.

26. A lithopone as defined in claim 24 in which the pH value is between 6.5 and 7.5.

27. A light-resistant lithopone containing from about 0.001 to 0.06% of chlorine, and yielding, upon heating 10 grams of said lithopone with 100 c. c. of water, an aqueous extract that has a pH value between 5.5 and 8.

28. A lithopone as defined in claim 27 in which the aqueous extract has a pH value between 6.5 and 7.5.

29. A lithopone as defined in claim 24 in which the proportion of water-soluble material is less than 0.25%.

30. A lithopone as defined in claim 27 in which the proportion of water-soluble material is less than 0.25%.

31. A lithopone as defined in claim 24 in which the proportion of water-soluble material is about 0.1%.

In testimony whereof I affix my signature.

JAMES ELIOT BOOGE.